United States Patent [19]
Mercier et al.

[11] Patent Number: 6,113,195
[45] Date of Patent: Sep. 5, 2000

[54] ROTATABLE CUTTING BIT AND BIT WASHER THEREFOR

[75] Inventors: Greg D. Mercier, Bristol; Gary A. Fuller, Abingdon; Brian K. Widener, Bristol, all of Va.; Chris J. McSharry, Ooltewa, Tenn.

[73] Assignee: Sandvik AB, Sandviken, Sweden

[21] Appl. No.: 09/168,061

[22] Filed: Oct. 8, 1998

[51] Int. Cl.[7] .......................... E21C 35/197; E21C 35/18
[52] U.S. Cl. .......................... 299/104; 299/106; 299/107
[58] Field of Search .................................. 299/104, 106, 299/107

[56] References Cited

U.S. PATENT DOCUMENTS

| | | | |
|---|---|---|---|
| 3,746,396 | 7/1973 | Radd | 299/104 |
| 4,660,890 | 4/1987 | Mills | 299/104 |
| 4,818,027 | 4/1989 | Simon | 299/104 |
| 4,932,723 | 6/1990 | Mills | 299/104 |
| 5,415,462 | 5/1995 | Massa | 299/104 |
| 5,931,542 | 8/1999 | Britzke et al. | 299/104 |

*Primary Examiner*—Eileen D. Lillis
*Assistant Examiner*—John Kreck
*Attorney, Agent, or Firm*—Burns, Doane, Swecker & Mathis, L.L.P.

[57] ABSTRACT

A cutter tool comprises a tool holder, a cutting bit mounted in a bore of the tool holder, and a washer disposed between the tool holder and the cutting bit. The washer is a conical (Belleville) washer which makes annular line contact with a shoulder of the cutting bit, and with an edge of the bore of the tool holder, in order to effectively seal-out fines from the bore.

19 Claims, 4 Drawing Sheets

FIG. 2
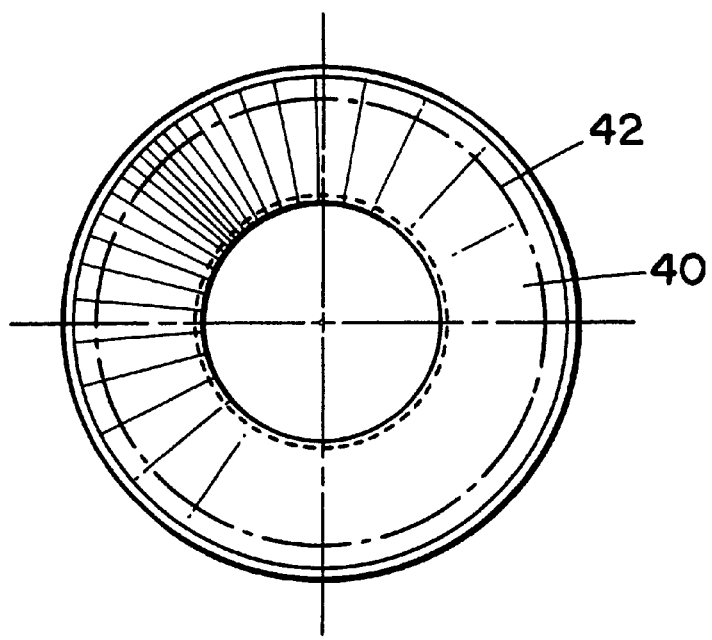
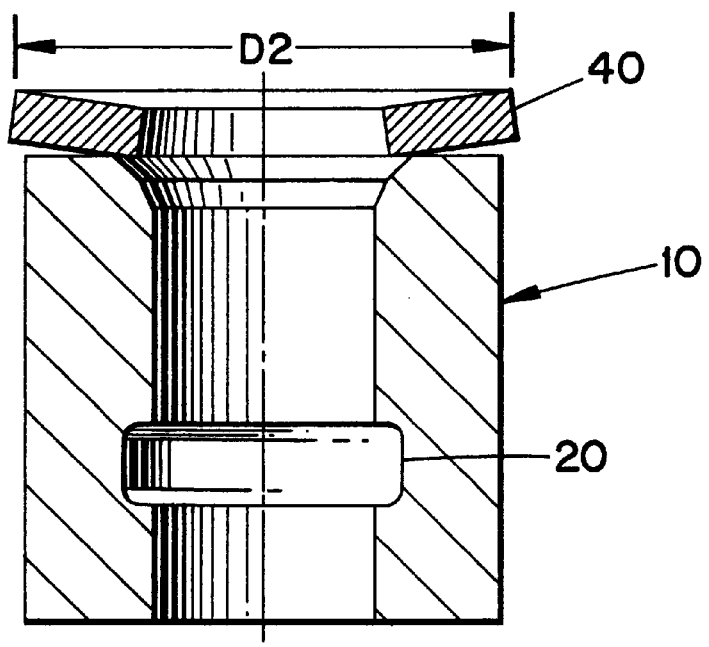
FIG. 1B

ROTATABLE CUTTING BIT AND BIT WASHER THEREFOR

BACKGROUND OF THE INVENTION

The present invention relates primarily to mining, trenching and construction tools which are comprised of a hardened steel body with a hard tip and a hardened steel retainer sleeve. These tools are mounted to drums, chains and wheel in various orientations and number. The vehicle to which the bit is mounted is then engaged in soft rock formations ranging from asphalt to sandstone. The hard tip fixed to the end of the tool directly engages the material being mined or cut.

Typically conical cutter tools are mounted into a tool holder in a fashion so as to allow free rotation of the tool during service, such as can be seen in Simon U.S. Pat. No. 4,818,027 and Massa U.S. Pat. No. 5,415,462. The tool retainer and holder are designed to retain the tool axially in the holder while allowing free rotation of the tool in service. Despite the design to allow free rotation, certain cutting applications such as asphalt milling and the continuous mining of coal cause tool rotation to be inhibited by fines accumulating between the mating surfaces of the tool holder and cutter tool. Once the accumulated fines become tightly packed between the tool retainer and the tool body and/or between the tool shoulder and the holder face, rotation is greatly reduced. Following reduced rotation, a wear flat will develop on the hard tip of the tool progressing down onto the steel body. After developing a wear flat, the tool rotation generally stops, whereby the remaining useful tool life is lost.

Also, during a cutting operation, the bit is subjected to a cutting force that is inclined relative to the longitudinal axis of the bit. As a result, the bit tends to be displaced in a lateral direction relative to the holder, which can produce additional frictional wear of the tool shoulder and/or the holder face.

SUMMARY OF THE INVENTION

The present invention relates to a cutter assembly which comprises a cutting bit, and a washer. The cutting bit comprises a body forming a forward cutting tip, a rearwardly extending shank, and a rearwardly facing bit shoulder disposed at a front end of the shank. The bit shoulder lies in a first plane. The washer is mounted on the shank and comprises a front surface and a rear surface. The front surface is engageable with the bit shoulder and lies in a second plane extending non-parallel to the first plane.

The present invention also relates to a combination of the cutter assembly described above, in combination with a tool holder. The tool holder includes a holder surface and a bore extending rearwardly through the holder surface. The front surface of the washer engages the bit shoulder, and a back surface of the washer engages the holder surface.

Another aspect of the invention relates to an annular washer comprising a body having inner and outer peripheral surfaces. The inner peripheral surface forms a center hole and defines a longitudinal axis of the washer. The body further includes first and second main surfaces each extending from the outer peripheral surface to the inner peripheral surface. The first main surface faces generally in a first axial direction, and the second main surface faces generally in a second axial direction opposite to the first axial direction. The first main surface is of generally conical shape to define a recess and is beveled at an intersection with the inner peripheral surface. The second main surface includes outer and inner portions extending away from the outer and inner peripheral walls, respectively and intersecting one another. The outer and inner portions form different respective oblique angles with respect to the axis, whereby the intersection of the outer and inner portions forms an angle which opens generally in the second axial direction.

BRIEF DESCRIPTION OF THE DRAWINGS

The objects and advantages of the invention will become apparent from the following detailed description of preferred embodiments thereof in connection with the accompanying drawing in which like numerals designate like elements and in which:

FIG. 1B is a view similar to FIG. 1A without the cutting bit;

FIG. 2 is a plan view of the washer depicted in FIG. 1B;

Figure 1A:
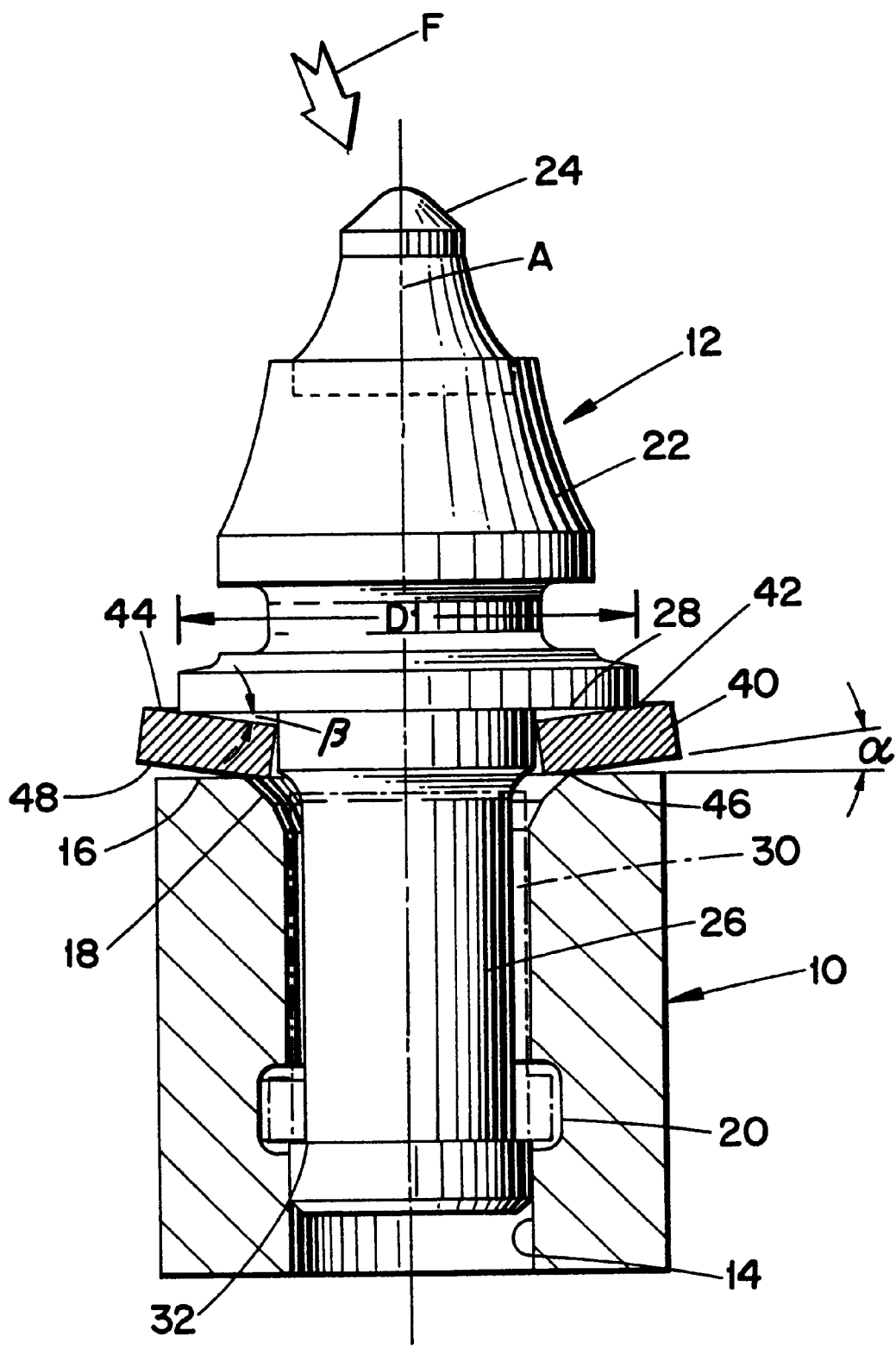
FIG. 1A is a sectional view of a rotatable cutting bit inserted into a bit holder having a first type of washer according to the present invention.

DETAILED DESCRIPTION OF PREFERRED Embodiments of the Invention

Depicted in FIG. 1 is a tool holder 10 adapted to be mounted, e.g. bolted or welded, to a vehicle, and a cutting bit 12 mounted in the holder. There would normally be a plurality of holders 10 and bits 12 mounted on a carrier, such as a rotary drum disposed on the vehicle.

The holder can be formed of steel and includes a cylindrical bore 14 extending through a front face 16 of the holder. The bore 14 has a front bevel 18 at the front face 16 (usually about 40–50 degrees), and an annular enlargement 20 spaced rearwardly from the front face.

The bit 12 includes a body 22 formed for example of hardened steel, and a hard tip 24 (e.g., formed of cemented carbide) mounted in a front end of the body 22. A rear portion of the body is defined by a cylindrical shank 26 which terminates forwardly at a bit shoulder 28 that faces the holder face 16.

Disposed around the shank 26 is a retainer sleeve 30 formed for example of hardened steel (shown in broken lines) which includes an annular projection that fits into the annular recess 20. A forwardly facing rear surface 32 of the shank abuts the retainer sleeve 30 to retain the bit within the bore.

It is conventional to provide a flat washer between the bit shoulder 28 and the holder face 16 to aid in keeping dirt and other fines from reaching the bore during a cutting operation. However, in accordance with the present invention, a conical washer, commonly known as a Belleville washer 40, is utilized which is of frusto-conical shape, i.e., is inherently tapered, and forms an oblique angle β with the plane of the bit shoulder 28. Accordingly, there is produced an annular line contact 42 between the bit shoulder 28 and a front surface 44 of the washer, and annular line contact 46 between a rear surface 48 of the washer and a front edge of the bore 14. By concentrating the cutting force F along those two lines, in contrast to a surface or area type of contact as would occur with the prior art use of flat washers, a tighter, more gap-free contact occurs which is better able to prevent fines from reaching the bore 14 during a cutting operation.

Preferably, the washer has a taper angle of 4–12 degrees.

The washer 40 is positioned such that the outer periphery thereof is disposed farther forwardly than the inner periphery thereof. The inner periphery is thus able to enter the region of the bore formed by the bevel 18. The outer diameter of the washer is chosen so as to be greater than the outer diameter of the bit shoulder 28 so that the outer edge of the bit shoulder is guaranteed to make contact with the washer's front surface 44. Preferably, the outer diameter D2 of the washer is 1.05 to 1.5 times the outer diameter D1 of the bit shoulder.

The front surface 44 is inclined in a direction extending radially outwardly and longitudinally forwardly and thereby tends to center the bit within the bore. That is, the front surface 44 opposes lateral movement of the bit relative to the holder, which movement tends to be produced by the fact that the force F is applied against the bit in a direction forming an acute angle generally between 40–60° relative to the longitudinal axis A, as can be seen in FIG. 1A. Consequently, frictional wearing of the bit shoulder and/or holder face which would result from such lateral bit movement is reduced.

It has been found that during a cutting operation, as the bit rotates about the axis A, the washer 40 does not remain stationary, nor does the washer rotate exactly with the bit. Rather, the washer rotates somewhat, i.e. it rotates relative to both the holder and the bit.

During use over time, it is common for the holder 10 to be used for more total hours than the tool assembly comprised of the bit 12, the washer 40, and the retainer sleeve 30, because the holder wears more slowly. That tool assembly will be replaced much more frequently than the holder. Accordingly, the portion of the holder face 16 closest to the bore 14 will eventually transform into surface contact of gradually increasing area. That means that the original line contact between the washer 40 and a new holder 10 will eventually transform into surface contact of gradually increasing area. Thus, over time, the sealing effectiveness of the contact between the washer and the holder will gradually deteriorate, but the sealing effectiveness of the contact between the washer and the bit will not, because the latter contact will always be substantially line contact due to the greater frequency of bit replacement.

Figure 3:
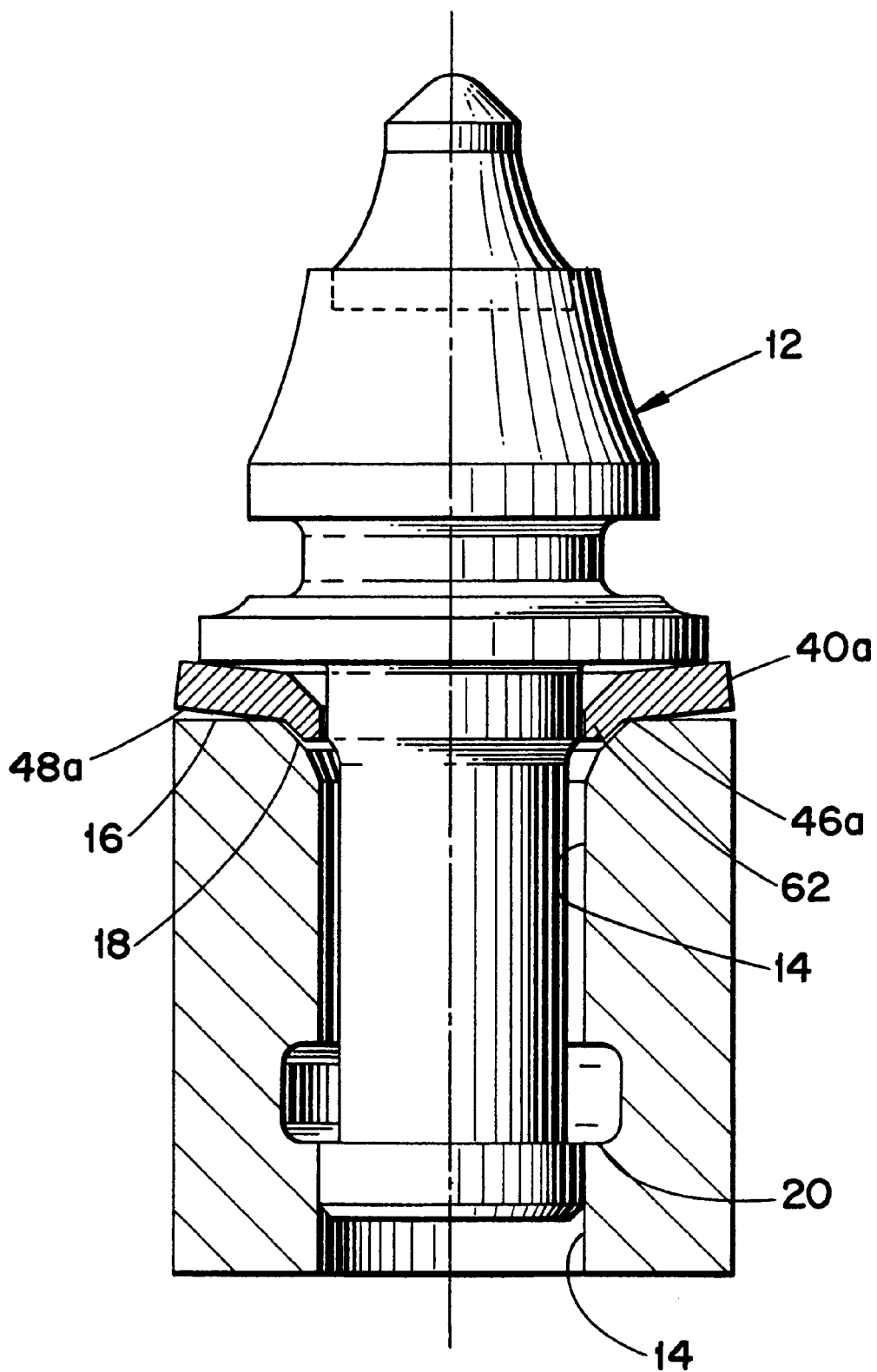
FIG. 3 is a view similar to FIG. 1 wherein a second embodiment of a washer according to the present invention is employed.
Figure 3A:
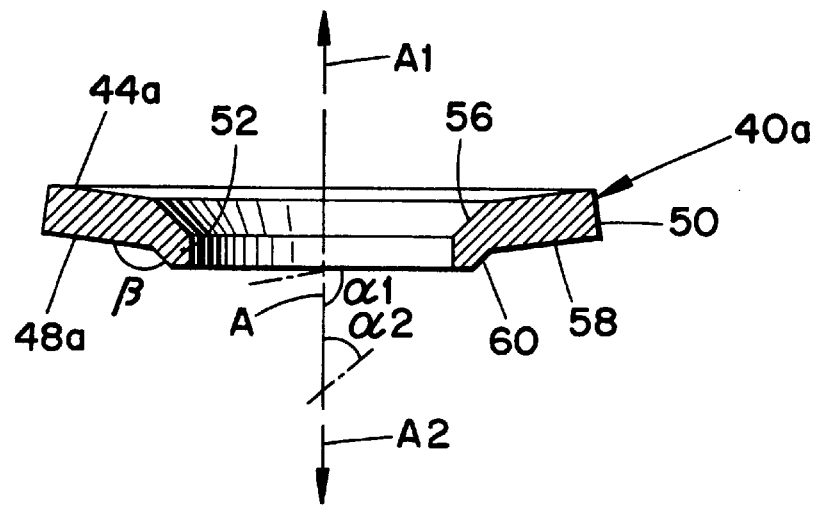
FIG. 3A is a sectional view taken through the washer of FIG. 3.

Another embodiment of the bit washer 40a is depicted in FIGS. 3 and 3A wherein each of the front and rear main surfaces 44a, 48a extends from the outer peripheral surface 50 to the inner peripheral surface 52 which defines the center hole of the washer. The front main surface 44a faces in a first axial direction A1, and the rear main surface 48a faces in a second, opposite axial direction A2. The front main surface 44a is of generally conical shape to define a recess, and includes a bevel 56 (e.g., a bevel of 40–50°) at the intersection with the inner peripheral surface 52.

The rear main surface 48a includes an outer portion 58 extending away from the outer peripheral surface 50, and an inner portion 60 which extends away from the inner peripheral surface 52. The portions 58, 60 form different angles 1 and 2 with the axis A whereby the intersection of the outer and inner portions forms an angle β which opens in the axial direction A2.

Thus, the inner periphery of the washer 40a forms a rearwardly projecting lip 62. Initially, the rear main surface 48a makes annular line contact with the holder face 16 at 46a. Eventually, the holder face will wear, as explained above, whereby the inner surface portion 60 will make surface contact with the holder face. Then, however, that surface contact performs the advantage of aiding in the resistance to lateral displacement of the bit 12 since it will abut the bevel 18 of the bore 14.

Figure 4:
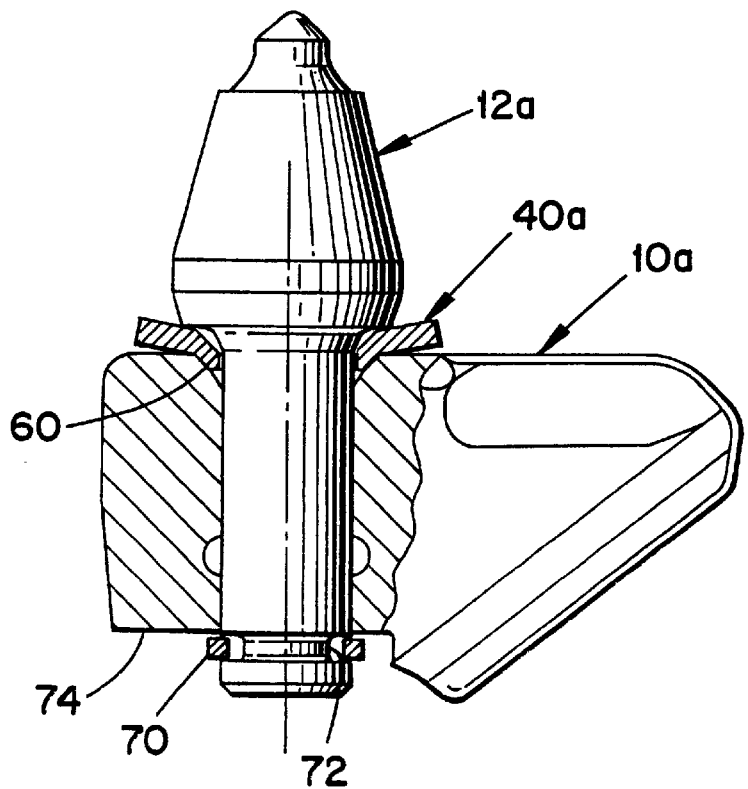
FIG. 4 is a view of a cutting bit and holder employed in a trenching machine, with the washer being of the type disclosed in connection with FIG. 3.

FIG. 4 depicts how a bit assembly and a washer 40a according to the invention would be arranged in a conventional holder 10a used in a trenching machine. Also depicted is how the rearwardly projecting lip 62 would engage a worn holder surface to resist lateral movement of the washer 40a and the bit 12. The bit 12a is retained by means of a conventional resilient retaining ring 70 which is mounted in a recess 72 of the bit and which is engageable with a back wall 74 of the holder 10a.

In accordance with the present invention, annular line contact is established between the washer and the bit, and at least initially between the washer and the holder (i.e., before the holder becomes worn). That line contact creates an effective seal which resists the entry of fines (cuttings, dirt etc.) into the bore which would oppose rotation of the bit. As a result, the cutting tip stays sharp and heat build-up is resisted. Moreover, the contact of the bit shoulder with a tapered (e.g. conical) surface of the washer tends to keep the bit centered in the bore, thereby resisting lateral movement of the bit and the accompanying wear.

The provision of a rearwardly projecting lip at the inner periphery of the washer results in a greater resistance to lateral movement of the bit.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutter assembly comprising a cutting bit and a washer, the cutting bit comprising a body forming a forward cutting tip, a rearwardly extending shank, and a rearwardly facing bit shoulder disposed at a front end of the shank; the washer mounted on the shank and comprising a front surface and a rear surface, the front surface forming an oblique angle with respect to the bit shoulder and make line contact with the bit shoulder.

2. The cutter assembly according to claim 1 wherein the taper of the front surface is such that an inner periphery of the front surface is disposed rearwardly of an outer periphery of the front surface.

3. The cutter assembly according to claim 2 wherein the taper of the front surface measured from a plane oriented perpendicular to the shank is 4 to 12 degrees.

4. The cutter assembly according to claim 1 wherein the front surface is of generally frusto-conical configuration.

5. The cutter assembly according to claim 1 wherein the bit shoulder has an outer diameter D1, the front surface of the washer having an outer diameter D2, a ratio of D2 to D1 being in the range of 1.05 to 1.50.

6. The cutter assembly according to claim 1 wherein an inner periphery of the washer is configured as a rearwardly projecting lip.

7. The cutter according to claim 6 wherein a portion of the front surface of the washer extending along the lip comprises a chamfer of from 40–50 degrees.

8. A cutter tool comprising:

a tool holder including a holder surface and a bore extending rearwardly through the holder surface;

a cutting bit including a body having a front cutting tip, a rearwardly projecting shank rotatably mounted in the bore, and a rearwardly facing bit shoulder disposed at a front end of the shank;

a washer disposed between the bit shoulder and the holder surface, the washer comprising a front surface engaging the bit shoulder, and a back surface engaging the holder surface, the front surface forming an oblique angle with respect to the bit shoulder and make annular line contact with the bit shoulder.

9. The cutter assembly according to claim 8 wherein the taper of the front surface is such that an inner periphery of the front surface is disposed rearwardly of an outer periphery of the front surface.

10. The cutter assembly according to claim 9 wherein the taper of the front surface measured from a plane oriented perpendicular to the shank is 4 to 12 degrees.

11. The cutter assembly according to claim 8 wherein the front surface is of generally frusto-conical configuration.

12. The cutter assembly according to claim 8 wherein the washer comprises a Belleville washer.

13. The cutter assembly according to claim 8 wherein the annular line contact occurs closer to an outer periphery of the washer than to an inner periphery thereof.

14. The cutter assembly according to claim 8 wherein the bit shoulder has an outer diameter D1, the front surface of the washer having an outer diameter D2, a ratio of D2 to D1 being in the range of 1.05 to 1.50.

15. The cutter assembly according to claim 8 wherein an inner periphery of the washer is configured as a rearwardly projecting lip.

16. The cutter tool according to claim 8 wherein the bore includes a bevel at the holder surface.

17. A cutter assembly comprising a cutting bit and a Belleville washer, the cutting bit comprising a body forming a forward cutting tip, a rearwardly extending shank, and a rearwardly facing bit shoulder disposed at a front end of the shank;

the Belleville washer mounted on the shank and comprising a front surface and a rear surface, the front surface being tapered to make line contact with the bit shoulder.

18. A cutter assembly comprising a cutting bit and a washer, the cutting bit comprising a body forming a forward cutting tip, a rearwardly extending shank, and a rearwardly facing bit shoulder disposed at a front end of the shank;

the washer mounted on the shank and comprising a front surface and a rear surface, the front surface being tapered to make annular line contact with the bit shoulder, the annular line contact occurring closer to an outer periphery of the washer than to an inner periphery thereof.

19. A cutter tool comprising:

a tool holder including a holder surface and a bore extending rearwardly through the holder surface;

a cutting bit including a body having a front cutting tip, a rearwardly projecting shank rotatably mounted in the bore, and a rearwardly facing bit shoulder disposed at a front end of the shank;

a washer disposed between the bit shoulder and the holder surface, the washer comprising a front surface engaging the bit shoulder, and a back surface engaging the holder surface, the front surface being tapered to make annular line contact with the bit shoulder, and the back surface being tapered to make annular line contact with a front edge of the bore.

\* \* \* \* \*